(12) United States Patent
Blum et al.

(10) Patent No.: US 7,290,875 B2
(45) Date of Patent: Nov. 6, 2007

(54) ELECTRO-ACTIVE SPECTACLES AND METHOD OF FABRICATING SAME

(76) Inventors: Ronald D. Blum, 5320 Silver Fox Rd., Roanoke, VA (US) 24014; William Kokonaski, 1807 44th Street Ct., NW., Gig Harbor, WA (US) 98335

( * ) Notice: Subject to any disclaimer, the term of this patent is extended or adjusted under 35 U.S.C. 154(b) by 0 days.

(21) Appl. No.: 11/263,049

(22) Filed: Oct. 31, 2005

(65) Prior Publication Data

US 2006/0092340 A1    May 4, 2006

Related U.S. Application Data

(60) Provisional application No. 60/623,947, filed on Nov. 2, 2004.

(51) Int. Cl.
*G02C 7/02* (2006.01)
*G02C 5/00* (2006.01)
(52) U.S. Cl. .................. 351/159; 351/140; 349/13
(58) Field of Classification Search ................. 351/159, 351/41; 349/200, 13
See application file for complete search history.

(56) References Cited

U.S. PATENT DOCUMENTS

| | | | |
|---|---|---|---|
| 2,437,642 A | 3/1948 | Henroleau |
| 2,576,581 A | 11/1951 | Edwards |
| 3,161,718 A | 12/1964 | De Luca |
| 3,245,315 A | 4/1966 | Marks et al. |
| 3,309,162 A | 3/1967 | Kosanke et al. |
| 3,614,215 A | 10/1971 | Mackta |
| 3,738,734 A | 6/1973 | Tait et al. |
| 3,791,719 A | 2/1974 | Kratzer et al. |
| 4,174,156 A | 11/1979 | Glorieux |
| 4,181,408 A | 1/1980 | Senders |
| 4,190,330 A | 2/1980 | Berreman |
| 4,264,154 A | 4/1981 | Petersen |
| 4,279,474 A | 7/1981 | Belgorod |
| 4,300,818 A | 11/1981 | Schachar |
| 4,373,218 A | 2/1983 | Schachar |

(Continued)

FOREIGN PATENT DOCUMENTS

EP    0154962 A2    9/1985

(Continued)

OTHER PUBLICATIONS

Kowel, Stephen T., et. al; Focusing by electrical modulation of refraction in a liquid crystal cell; Applied Optics; Jan. 15, 1984; vol. 23, No. 2.

(Continued)

*Primary Examiner*—Jordan M. Schwartz
(74) *Attorney, Agent, or Firm*—Pearl Cohen Zedek Latzer, LLP

(57) ABSTRACT

A composite lens assembly comprising an electro-active lens assembly, a first lens wafer, and a second lens wafer is provided. The electro-active lens assembly has an upper substrate layer with a planar upper surface and a lower substrate layer with a planar lower surface. The first lens wafer has a planar lower wafer surface adjacent and parallel to the planar upper surface of the upper substrate layer of the electro-active lens assembly. The second lens wafer has a planar upper wafer surface adjacent and parallel to the planar lower surface of the lower substrate layer of the electro-active lens assembly.

8 Claims, 8 Drawing Sheets

U.S. PATENT DOCUMENTS

| | | |
|---|---|---|
| 4,395,736 A | 7/1983 | Fraleux |
| 4,418,990 A | 12/1983 | Gerber |
| 4,423,929 A | 1/1984 | Gomi |
| 4,457,585 A | 7/1984 | DuCorday |
| 4,466,703 A | 8/1984 | Nishimoto |
| 4,466,706 A | 8/1984 | Lamothe, II |
| 4,529,268 A | 7/1985 | Brown |
| 4,564,267 A | 1/1986 | Nishimoto |
| 4,572,616 A | 2/1986 | Kowel et al. |
| 4,577,928 A | 3/1986 | Brown |
| 4,601,545 A | 7/1986 | Kern |
| 4,609,824 A | 9/1986 | Munier et al. |
| 4,712,870 A | 12/1987 | Robinson et al. |
| 4,756,605 A | 7/1988 | Okada et al. |
| 4,772,094 A | 9/1988 | Sheiman |
| D298,250 S | 10/1988 | Kildall |
| 4,787,733 A | 11/1988 | Silva |
| 4,787,903 A | 11/1988 | Grendahl |
| 4,795,248 A * | 1/1989 | Okada et al. ............... 351/158 |
| 4,813,777 A | 3/1989 | Rainville et al. |
| 4,818,095 A | 4/1989 | Takeuchi |
| 4,836,652 A | 6/1989 | Oishi et al. |
| 4,842,400 A | 6/1989 | Klein |
| 4,880,300 A | 11/1989 | Payner et al. |
| 4,890,903 A | 1/1990 | Treisman et al. |
| 4,904,063 A | 2/1990 | Okada et al. |
| 4,907,860 A | 3/1990 | Noble |
| 4,909,626 A | 3/1990 | Purvis et al. |
| 4,919,520 A | 4/1990 | Okada et al. |
| 4,921,728 A | 5/1990 | Takiguchi |
| 4,927,241 A | 5/1990 | Kuijk |
| 4,929,865 A | 5/1990 | Blum |
| 4,930,884 A | 6/1990 | Tichenor et al. |
| 4,944,584 A | 7/1990 | Maeda et al. |
| 4,945,242 A | 7/1990 | Berger et al. |
| 4,952,788 A | 8/1990 | Berger et al. |
| 4,958,907 A | 9/1990 | Davis |
| 4,961,639 A | 10/1990 | Lazarus |
| 4,968,127 A | 11/1990 | Russell et al. |
| 4,981,342 A | 1/1991 | Fiala |
| 4,991,951 A | 2/1991 | Mizuno et al. |
| 5,015,086 A | 5/1991 | Okaue et al. |
| 5,030,882 A | 7/1991 | Solero |
| 5,050,981 A | 9/1991 | Roffman |
| 5,066,301 A | 11/1991 | Wiley |
| 5,067,795 A | 11/1991 | Senatore |
| 5,073,021 A | 12/1991 | Marron |
| 5,076,665 A | 12/1991 | Petersen |
| 5,089,023 A | 2/1992 | Swanson |
| 5,091,801 A | 2/1992 | Ebstein |
| 5,108,169 A | 4/1992 | Mandell |
| 5,114,628 A | 5/1992 | Hofer et al. |
| 5,130,856 A | 7/1992 | Tichenor et al. |
| 5,142,411 A | 8/1992 | Fiala |
| 5,150,234 A * | 9/1992 | Takahashi et al. ............. 349/1 |
| 5,171,266 A | 12/1992 | Wiley et al. |
| 5,182,585 A | 1/1993 | Stoner |
| 5,184,156 A * | 2/1993 | Black et al. ................ 351/158 |
| 5,200,859 A | 4/1993 | Payner et al. |
| 5,208,688 A | 5/1993 | Fergason et al. |
| 5,229,797 A | 7/1993 | Futhey et al. |
| 5,229,885 A | 7/1993 | Quaglia |
| 5,231,430 A | 7/1993 | Kohayakawa |
| 5,239,412 A | 8/1993 | Naka et al. |
| D342,063 S | 12/1993 | Howitt et al. |
| 5,306,926 A | 4/1994 | Yonemoto |
| 5,324,930 A | 6/1994 | Jech, Jr. |
| D350,342 S | 9/1994 | Sack |
| 5,352,886 A | 10/1994 | Kane |
| 5,359,444 A | 10/1994 | Piosenka et al. |
| 5,375,006 A | 12/1994 | Haas |
| 5,382,986 A | 1/1995 | Black et al. |
| 5,386,308 A | 1/1995 | Michel et al. |
| 5,424,927 A | 6/1995 | Schaller et al. |
| 5,440,357 A | 8/1995 | Quaglia |
| 5,443,506 A | 8/1995 | Garabet |
| 5,451,766 A | 9/1995 | Van Berkel |
| 5,488,439 A | 1/1996 | Weltmann |
| 5,522,323 A | 6/1996 | Richard |
| 5,552,841 A | 9/1996 | Gallorini et al. |
| 5,608,567 A | 3/1997 | Grupp |
| 5,615,588 A | 4/1997 | Gottschald |
| 5,654,786 A | 8/1997 | Bylander |
| 5,668,620 A | 9/1997 | Kurtin et al. |
| 5,682,223 A | 10/1997 | Menezes et al. |
| 5,683,457 A | 11/1997 | Gupta et al. |
| RE35,691 E | 12/1997 | Theirl et al. |
| 5,712,721 A | 1/1998 | Large |
| 5,728,155 A | 3/1998 | Anello et al. |
| 5,739,959 A | 4/1998 | Quaglia |
| 5,777,719 A | 7/1998 | Williams et al. |
| 5,815,233 A | 9/1998 | Morokawa et al. |
| 5,815,239 A | 9/1998 | Chapman et al. |
| 5,861,936 A | 1/1999 | Sorensen |
| 5,877,876 A | 3/1999 | Birdwell |
| 5,900,720 A | 5/1999 | Kallman et al. |
| 5,949,521 A | 9/1999 | Williams et al. |
| 5,953,098 A | 9/1999 | Lieberman et al. |
| 5,956,183 A | 9/1999 | Epstein et al. |
| 5,963,300 A | 10/1999 | Horwitz |
| 5,971,540 A | 10/1999 | Ofner |
| 5,980,037 A | 11/1999 | Conway |
| 5,999,328 A | 12/1999 | Kurtin et al. |
| 6,040,947 A | 3/2000 | Kurtin et al. |
| 6,050,687 A | 4/2000 | Bille et al. |
| 6,069,742 A | 5/2000 | Silver |
| 6,086,204 A | 7/2000 | Magnante |
| 6,095,651 A | 8/2000 | Williams et al. |
| 6,099,117 A | 8/2000 | Gregory |
| 6,115,177 A | 9/2000 | Vossler |
| 6,145,987 A | 11/2000 | Baude et al. |
| 6,188,525 B1 | 2/2001 | Silver |
| 6,191,881 B1 | 2/2001 | Tajima |
| 6,213,602 B1 | 4/2001 | Smarto |
| 6,270,220 B1 | 8/2001 | Keren |
| 6,271,915 B1 | 8/2001 | Frey et al. |
| 6,305,802 B1 | 10/2001 | Roffman et al. |
| 6,325,508 B1 | 12/2001 | Decreton et al. |
| 6,350,031 B1 | 2/2002 | Lashkari et al. |
| 6,396,622 B1 | 5/2002 | Alden |
| 6,437,762 B1 | 8/2002 | Birdwell |
| 6,437,925 B1 | 8/2002 | Nishioka |
| 6,464,363 B1 | 10/2002 | Nishioka et al. |
| 6,491,394 B1 | 12/2002 | Blum et al. |
| 6,501,443 B1 | 12/2002 | McMahon |
| 6,554,425 B1 | 4/2003 | Roffman et al. |
| 6,609,794 B2 | 8/2003 | Levine |
| 6,614,408 B1 | 9/2003 | Mann |
| 6,616,275 B1 | 9/2003 | Dick et al. |
| 6,616,279 B1 | 9/2003 | Davis et al. |
| 6,618,208 B1 | 9/2003 | Silver |
| 6,626,532 B1 | 9/2003 | Nishioka et al. |
| 6,631,001 B2 | 10/2003 | Kuiseko |
| 6,682,195 B2 | 1/2004 | Dreher |
| 6,709,108 B2 | 3/2004 | Levine et al. |
| 6,738,199 B2 | 5/2004 | Nishioka |
| 6,768,536 B2 * | 7/2004 | Okuwaki et al. ........... 349/200 |
| 6,774,871 B2 | 8/2004 | Birdwell |
| 6,778,246 B2 | 8/2004 | Sun et al. |
| 6,833,938 B2 | 12/2004 | Nishioka |
| 6,840,619 B2 | 1/2005 | Dreher |
| 6,851,805 B2 | 2/2005 | Blum et al. |
| 6,893,124 B1 | 5/2005 | Kurtin |
| 6,918,670 B2 | 7/2005 | Blum et al. |

| | | | |
|---|---|---|---|
| 6,948,818 B2 | 9/2005 | Williams et al. | |
| 6,951,391 B2 | 10/2005 | Morris et al. | |
| 6,986,579 B2 | 1/2006 | Blum et al. | |
| 7,008,054 B1 | 3/2006 | Kurtin et al. | |
| 7,009,757 B2 | 3/2006 | Nishioka et al. | |
| 7,019,890 B2 | 3/2006 | Meredith et al. | |
| 7,085,065 B2 | 8/2006 | Silver | |
| 7,133,172 B2 | 11/2006 | Nishioka | |
| 2002/0140899 A1 | 10/2002 | Blum et al. | |
| 2002/0145701 A1* | 10/2002 | Sun et al. | 349/200 |
| 2002/0149739 A1 | 10/2002 | Perrott et al. | |
| 2002/0186346 A1 | 12/2002 | Stantz et al. | |
| 2003/0210377 A1* | 11/2003 | Blum et al. | 351/168 |
| 2004/0008319 A1 | 1/2004 | Lai et al. | |
| 2004/0084790 A1* | 5/2004 | Blum et al. | 264/1.32 |
| 2004/0108971 A1 | 6/2004 | Waldern et al. | |
| 2004/0117011 A1 | 6/2004 | Aharoni et al. | |
| 2004/0130677 A1 | 7/2004 | Liang et al. | |
| 2004/0179280 A1 | 9/2004 | Nishioka | |
| 2004/0196435 A1 | 10/2004 | Dick et al. | |
| 2004/0246440 A1 | 12/2004 | Andino et al. | |
| 2005/0124983 A1 | 6/2005 | Frey et al. | |
| 2006/0044510 A1 | 3/2006 | Williams et al. | |

FOREIGN PATENT DOCUMENTS

| | | |
|---|---|---|
| GB | 2170613 A | 8/1986 |
| GB | 2169417 A | 7/1987 |
| JP | 55-076323 | 6/1980 |
| JP | 05-100201 | 4/1993 |
| JP | 11352445 | 12/1998 |
| WO | WO-92/01417 | 2/1992 |
| WO | WO-98/27863 | 7/1998 |
| WO | WO-99/27334 | 6/1999 |
| WO | WO-03/050472 A1 | 6/2003 |
| WO | WO-03/068059 A2 | 8/2003 |
| WO | WO-2004/008189 A1 | 1/2004 |
| WO | WO-2004/015481 A1 | 2/2004 |
| WO | WO-2004/034095 A2 | 4/2004 |
| WO | WO-2004/072687 A2 | 8/2004 |

OTHER PUBLICATIONS

Thibos, Larry N., et. al.; Vision through a liquid-crystal spatial light modulator; Adaptive Optics Conference; 1999; Durham, UK.

Miller, Donald T., et. al.; Requirements for Segmented Spatial Light Modulators For Diffraction-Limited Imaging Through Aberrated Eyes, Adaptive Optics Conference.

Thibos, Larry N., et. al.; Use of Liquid-Crystal Adaptive-Optics to Alter the Refractive State of the Eye; Optometry and Vision Science; Jul. 1997; vol. 74, No. 7; American Academy of Optometry.

Thibos, Larry N., et. al.; Electronic Spectacles for the 21st Century, Indian Journal of Optometry, Spring 1999; vol. 2, No. 1.

Bradley, Arthur; Profile: Larry N. Thibos, PhD., and Donald T. Miller, PhD.; Indiana Journal of Optometry; Spring 1999; vol. 2, No. 1, page 1 only.

Naumov, A.F.; Control Optimization of Spherical Modal Liquid Crystal Lenses; Optics Express, Apr. 26, 1999; vol. 4, No. 9; Optical Society of America.

Naumov, A.F.; Liquid Crystal Adaptive Lenses with Modal Control; Optics Letters, Jul. 1, 1998, vol. 23, No. 13; Optical Society of America.

Liquid Lenses Eye Commercial Breakthrough; Opto & Laser Europe, Nov. 2003.

Anderson, M.; Adaptive Optics; Liquid Crystals Lower the Cost of Adaptive Optics; Laser Focus World, Dec. 1999.

Davis, Robert A.; Computer Vision Syndrome- The Eyestrain Epidemic ; Review of Optometry, Sep. 15, 1997.

Lazarus, Stuart M.; The Use of Yoked Base-Up and Base-In Prism for Reducing Eye Strain at the Computer; Journal of the American Optometric Association, Apr. 1996.

Eyecare Business, Oct. 1997.

\* cited by examiner

300
Composite lens assembly

390
Composite lens assembly

ELECTRO-ACTIVE SPECTACLES AND METHOD OF FABRICATING SAME

CROSS-REFERENCE TO RELATED APPLICATIONS

This application claims the benefit of U.S. Provisional Application 60/623,947 filed Nov. 2, 2004, which is incorporated herein by reference in its entirety.

This application incorporates by reference in their entirety all of the following applications, provisional applications, and patents: U.S. application Ser. No. 11/232,551 filed Sep. 22, 2005; U.S. Pat. No. 6,918,670 issued Jul. 19, 2005; U.S. application Ser. No. 11/183,454 filed Jul. 18, 2005; U.S. Provisional Application No. 60/692,270 filed Jul. 21, 2005; U.S. Provisional Application No. 60/687,342 filed Jun. 6, 2005; U.S. Provisional Application No. 60/687,341 filed Jun. 6, 2005; U.S. Provisional Application No. 60/685,407 filed May 31, 2005; U.S. Provisional Application No. 60/679,241 filed May 10, 2005; U.S. Provisional Application No. 60/674,702 filed Apr. 26, 2005; U.S. Provisional Application No. 60/673,758 filed Apr. 22, 2005; U.S. application Ser. No. 11/109,360 filed Apr. 19, 2005; U.S. Provisional Application No. 60/669,403 filed Apr. 8, 2005; U.S. Provisional Application No. 60/667,094 filed Apr. 1, 2005; U.S. Provisional Application No. 60/666,167 filed Mar. 30, 2005; U.S. Pat. No. 6,871,951 issued Mar. 29, 2005; U.S. application Ser. No. 11/091,104 filed Mar. 28, 2005; U.S. Provisional Application No. 60/661,925 filed Mar. 16, 2005; U.S. Provisional Application No. 60/659,431 filed Mar. 9, 2005; U.S. application Ser. No. 11/063,323 filed Feb. 22, 2005; U.S. Pat. No. 6,857,741 issued Feb. 22, 2005; U.S. Pat. No. 6,851,805 issued Feb. 8, 2005; U.S. application Ser. No. 11/036,501 filed Jan. 14, 2005; U.S. application Ser. No. 11/030,690 filed Jan. 6, 2005; U.S. application Ser. No. 10/996,781 filed Nov. 24, 2004; U.S. Provisional Application No. 60/623,947 filed Nov. 2, 2004; U.S. application Ser. No. 10/924,619 filed Aug. 24, 2004; U.S. application Ser. No. 10/918,496 filed Aug. 13, 2004; U.S. application Ser. No. 10/863,949 filed Jun. 9, 2004; U.S. Pat. No. 6,733,130 issued May 11, 2004; U.S. application Ser. No. 10/772,917 filed Feb. 5, 2004; U.S. Pat. No. 6,619,799 issued Sep. 16, 2003; U.S. application Ser. No. 10/664,112 filed Aug. 20, 2003; U.S. application Ser. No. 10/627,828 filed Jul. 25, 2003; U.S. application Ser. No. 10/387,143 filed Mar. 12, 2003; U.S. Pat. No. 6,517,203 issued Feb. 11, 2003; U.S. Pat. No. 6,491,391 issue Dec. 10, 2002; U.S. Pat. No. 6,491,394 issued Dec. 10, 2002; and U.S. application Ser. No. 10/263,707 filed Oct. 4, 2002.

FIELD OF THE INVENTION

The present invention relates generally to spectacles and, in particular to spectacles comprising electro-active lenses.

SUMMARY OF THE INVENTION

An illustrative aspect of the invention provides a composite lens assembly comprising an electro-active lens assembly, a first lens wafer, and a second lens wafer. The electro-active lens assembly has an upper substrate layer with a planar upper surface and a lower substrate layer with a planar lower surface. The first lens wafer has a planar lower wafer surface adjacent and parallel to the planar upper surface of the upper substrate layer of the electro-active lens assembly. The second lens wafer has a planar upper wafer surface adjacent and parallel to the planar lower surface of the lower substrate layer of the electro-active lens assembly.

This and other aspects will become apparent from the following description of the preferred embodiment taken in conjunction with the following drawings, although variations and modifications may be effected without departing from the spirit and scope of the novel concepts of the disclosure.

BRIEF DESCRIPTION OF THE DRAWINGS

The present invention can be more fully understood by reading the following detailed description together with the accompanying drawings, in which like reference indicators are used to designate like elements.

DETAILED DESCRIPTION OF THE INVENTION

Hereinafter, various embodiments of the invention will be described. As used herein, any term in the singular may be interpreted in the plural, and alternately, any term in the plural may be interpreted to be in the singular. The terms "upper" and "lower" refer merely to the relative orientation of the elements as shown in a particular figure, and do not imply any required final orientation of the electro-active lens assembly relative to the environment. Similarly, the terms "first" and "second" are used merely for convenience, and do not imply any required final orientation or order of assembly.

Embodiments of the invention provide spectacles formed as composite assemblies of electro-active lens elements and passive lens elements. As used herein, the term "electro-active lens" refers to a lens whose optical properties may be changed or modified with the application of electricity. Of particular interest are electro-active lenses formed from liquid crystal lens elements that may be configured for correction of any of a variety of vision problems.

The fabrication of a liquid crystal electro-active lens assembly and the incorporation of such a lens assembly into a composite lens assembly presents a number of challenges. For example, the structure of the electro-active lens element must be established so as to control the thickness of the liquid crystal layer and so as to allow edging (i.e., removal of material around the edges) of the composite electro-active lens assembly. Edging of lenses for spectacles is very important because edging properly aligns and positions the lenses (inside of the spectacle frame) relative to the eyes.

Another challenge is that electrical communication must be established among the electrical components (e.g., driver chip, contacts and electrodes) of the electro-active portion of the composite lens assembly. As will be discussed, this may be done through vias (small holes) which may be perpendicular to the layers, and thus avoid the edge of the electro-active lens assembly. This internal electrical communication may be similar to multi-layered integrated circuit design, wherein multiple layers are physically separated, but may communicate with each other through vias as needed.

Yet another challenge is the physical integration of the electro-active lens assembly into the composite lens assembly. In some embodiments, the composite lens assembly may be secured (held together) using screws or bolts, and these screws or bolts may serve as a convenient electrical path for the power supply. In this case, the composite lens assembly may be edged for proper positioning inside of a spectacle frame.

Embodiments of the invention will now be discussed in more detail.

Figure 1:
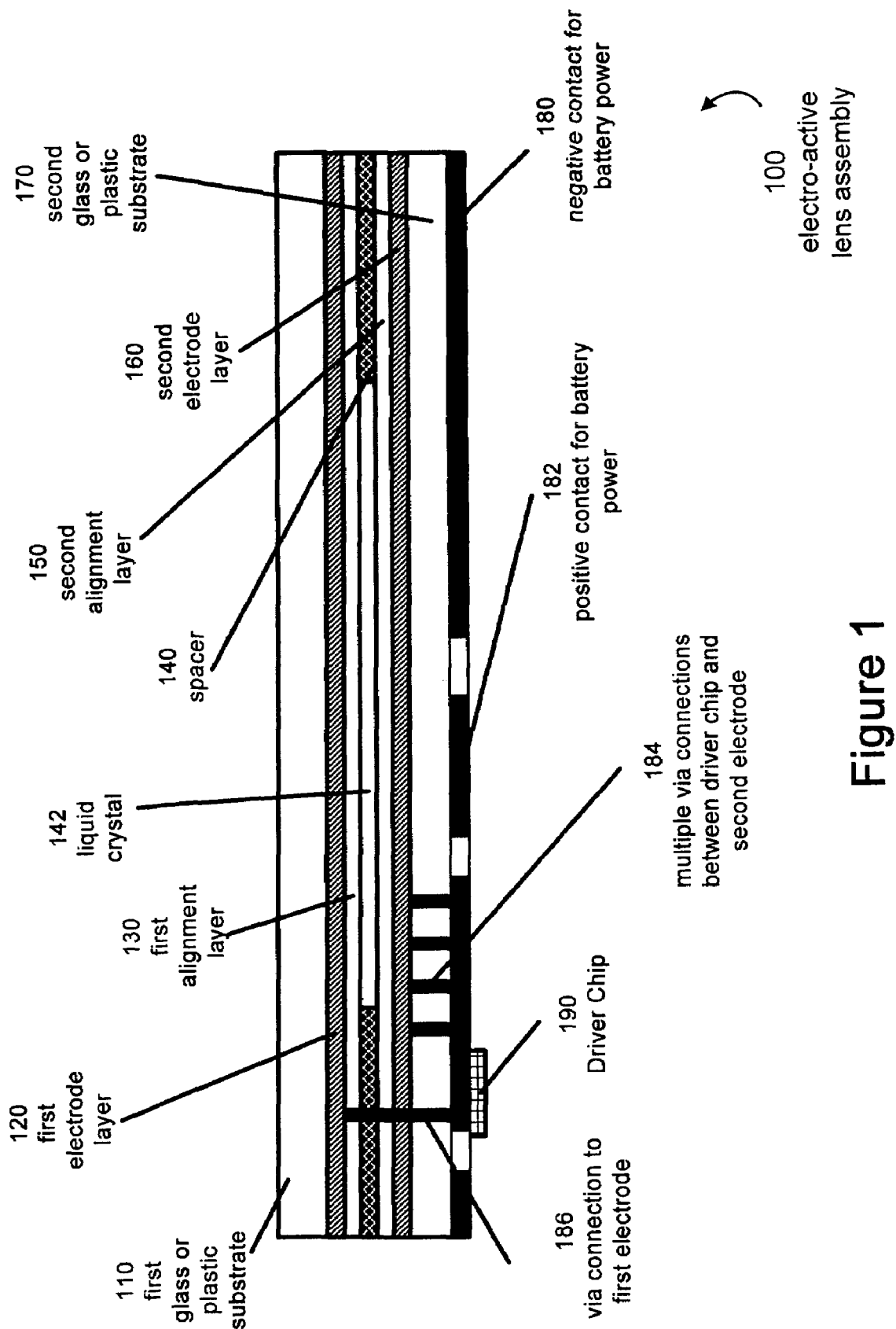
FIG. 1 is a section view of an electro-active lens assembly that may be used in or in conjunction with embodiments of the invention.

FIG. 1 displays an electro-active lens element assembly 100 that may be used in or in conjunction with embodiments of the invention. The electro-active lens assembly 100 is particularly adapted for use in the composite lens assemblies discussed below. The electro-active lens assembly 100 is essentially a laminate structure with both power contacts 180, 182 positioned on its lower surface. The layers of this laminate structure in order from the upper surface to the lower surface are:

a first glass or plastic substrate 110,
a first electrode layer 120,
a first alignment layer 130,
a liquid crystal layer comprising a spacer 140 surrounding a liquid crystal 142,
a second alignment layer 150,
a second electrode layer 160,
a second glass or plastic substrate 170,
a contact layer comprising a positive contact 182 for battery power, and a negative contact 180 for battery power,
a driver chip 190.

The driver chip 190 is connected to the first electrode layer 120 through a via connection 186, and the driver chip 190 is also connected to the second electrode layer 160 through multiple via connections 184.

The driver chip 190 may be positioned in another layer, for example inside of second glass or plastic substrate 170 with appropriate via connections to other elements. Alternately, the drive chip 190 may be positioned on the same layer as the second electrode layer, in order to minimize the number of necessary vias.

The first glass or plastic substrate 110, which may be referred to as the upper substrate 110, may be substantially flat on both the upper side and the lower side. The first glass or plastic substrate 110 may provide structural support for the other elements, and may provide electrical insulation for the other elements. The substantially flat lower side of the upper substrate 110 is adjacent to the substantially flat upper side of first electrode layer 120.

The first electrode layer 120 may be a solid electrode, and may serve as a reference electrode relative to the second electrode layer 160. The substantially flat lower side of first electrode layer 120 may serve as a substrate to attach alignment layer molecules. The lower side of the first electrode layer 120 is adjacent to the substantially flat upper side of the first alignment layer 130.

The first alignment layer 130 comprises materials that aid the alignment of the liquid crystal layer 142. The substantially flat lower surface of first alignment layer 130 is adjacent to liquid crystal 142 and spacer 140.

The optical properties of liquid crystal 142 may be changed by electric and magnetic fields. Alternately, the spacer 140 may be thicker than shown in FIG. 1, and may encircle all of the following: the first alignment layer 130, the liquid crystal 142, and the second alignment layer 150. The substantially flat lower side of liquid crystal layer 142 is adjacent to the substantially flat upper side of the second alignment layer 150.

Note that material may be removed from around the edge of the electro-active lens assembly without contacting or destroying the liquid crystal 142. Specifically, some of the spacer 140 may be removed or edged without contacting or destroying liquid crystal 142.

The second alignment layer 150 comprises materials that aid the alignment of the liquid crystal layer 142. The substantially flat lower side of alignment layer 150 is adjacent to the substantially flat upper side of second electrode layer 160.

The second electrode layer 160 may be solid, or may be segmented or patterned. For example, the second electrode layer 160 may be individually controlled pixels patterned into an arbitrary array, or may be patterned into other useful patterns such as a set of concentric circles. The multiple via connections 184 from the driver chip 190 may individually control the pixels or patterns. Note that the first electrode layer 120 may serve as a reference electrode in contrast to any voltages on the second electrode layer 160. The electric field created between the second electrode layer 160 and the first electrode layer 120 may affect the optical qualities (such as index of refraction or transmissivity) of the liquid crystal 142. The electrodes 120 and 160 may have spacers around them in order to insulate them from the edge, and in order to allow edging of the electro-active lens assembly 100. The substantially flat lower side of the second electrode 160 is adjacent to the substantially flat upper side of the second glass or plastic substrate 170.

The second glass or plastic substrate 170, which may be referred to as the lower substrate 170 may provide structural support for the other elements, and may provide electrical insulation for the other elements. The substantially flat lower side of the lower substrate 170 is adjacent to the substantially flat upper side of positive contact for battery power 182 and negative contact for battery power 180. In this embodiment, the positive contact 182 and negative contact 180 are on the same layer, but are not conductively attached directly together. Both contacts are conductively attached to the driver chip 190. Additionally, one of the contacts may be directly attached to the first electrode layer 120, and may serve as a reference for the second electrode layer 160.

The driver chip 190 may be physically attached to the second glass or plastic substrate 170, and may be conductively attached to the positive contact 182 and the negative contact 180. Further, there may be additional contacts (not shown) for conductive control signals, and there may be an antenna (not shown) for wireless signals. Alternately, control signals may be piggybacked onto the power supply voltage.

The electrode, alignment and liquid crystal layers combine to form an electro-active cell that is held between the upper and lower substrate layers. It will be understood that additional layers may also be included in the electro-active cell.

In some embodiments, the electrode layers 120 and 160 are formed on thin parallel glass or plastic sheets or slides and are covered with the alignment layers 130 and 150 to orient the molecules in the liquid crystal material. One or more of the electrodes may be patterned to allow for the designed optical effect. For example, if purely spherical power is required, then the pattern may comprise of a set of individually addressable concentric ring electrodes. If phase wrapping is used, the electrodes may be ganged or grouped to reduce the number of contacts needed to drive the lens. If a general or arbitrary optical effect is desired, for example a wave front correction for higher order aberrations, then the individually addressable pattern may comprise a Cartesian grid. The spacers 140 may be used to create a constant gap thickness that is filled with liquid crystal or other electro-active material. A driver chip may be mounted on one side of the electro-active lens assembly and electrical contacts are made through a group of vias drilled or cut or etched in the glass or plastic substrate.

If a polarization dependent nematic liquid crystal is used, then two electro-active lens assemblies like the one shown above may be stacked and oriented at a 90-degree angle to eliminate the effects of birefringence.

Alternatively, the solid electrode 120 may be converted to a patterned electrode and a common reference electrode placed in the center of the cell with a liquid crystal layer on each side of the common electrode. The common electrode may be constructed from a thin piece of glass or optical grade plastic coated with a transparent conductor on each side. The alignment layers on the two patterned electrodes may be oriented at 90-degrees from one another. In some embodiments, it may also be desirable to place an alignment layer on each side of the common electrode, which would be applied over the transparent conductor layers making up the common electrode, and oriented at 90-degree angles with one another. It will be understood that if a common reference electrode is added to the cell, one or more additional conductors/vias may be added to allow voltage application from the driver circuit to the new patterned electrode. Additional vias may also be used to make electrical contact between the new common electrode and the driver circuit.

If a cholesteric liquid crystal is used, then only a single cell will be required to produce the optical power. For the sake of simplicity we will limit the present discussion to cholesteric liquid crystal designs, with the understanding that the techniques described herein are applicable to nematic liquid crystal designs as well.

Figure 2:
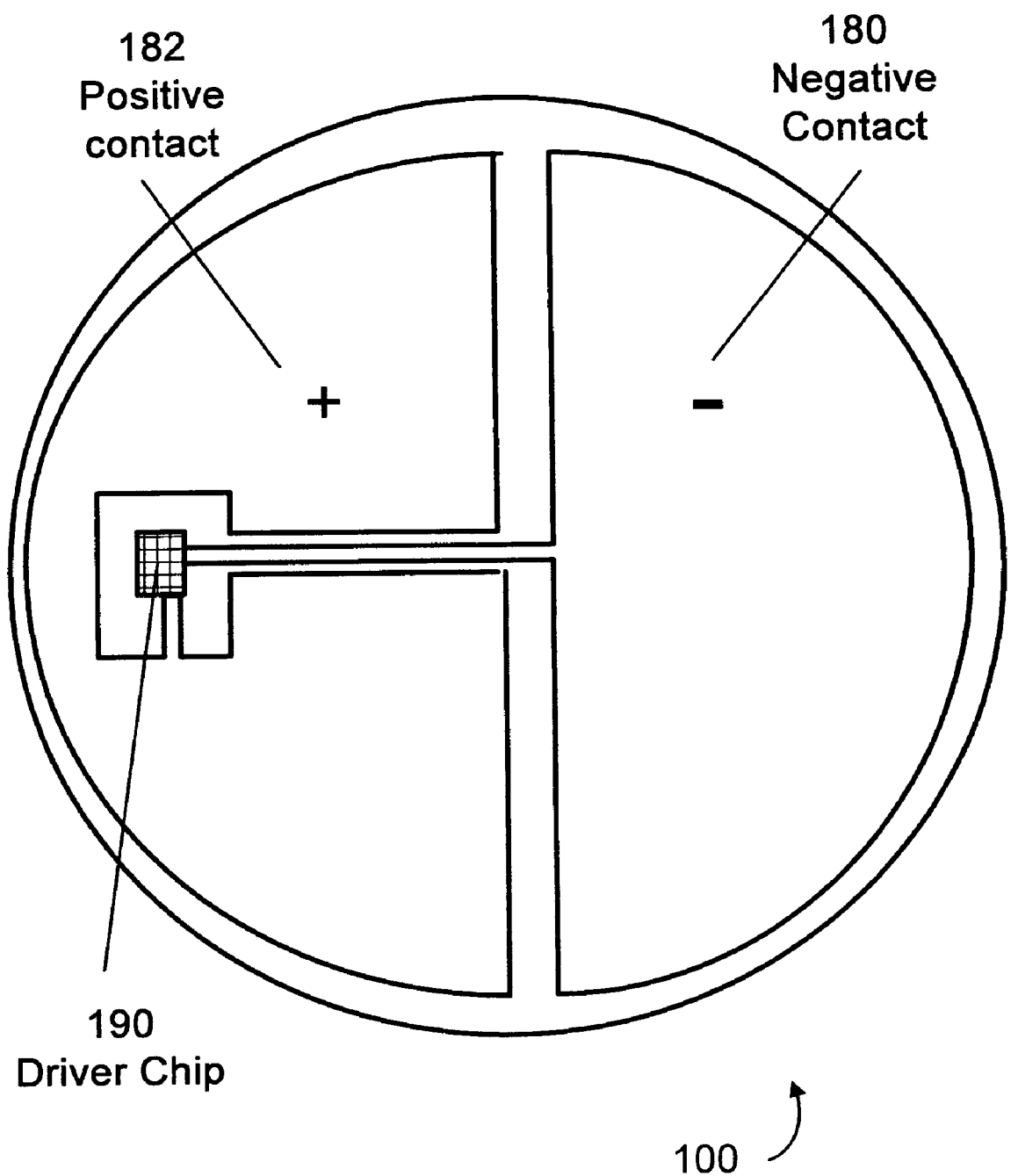
FIG. 2 is a bottom view of the electro-active lens assembly of FIG. 1.

FIG. 2 is a bottom view of the electro-active lens element 100 showing an illustrative configuration for the electrical contacts 180, 182. The contacts 180, 182 may be formed from a mostly or fully transparent conductive material such as, by way of example only, ITO. As shown in FIG. 2, the negative contact 180 may be configured to cover a substantial area, and may connect through a bus to the driver chip 190. The positive contact 182 may also cover a substantial area and may connect through a bus to the driver chip 190. The driver chip 190 may be mounted in an area free of electrically conductive material (except the positive and negative buses), so that the various output pins (not shown) of the driver chip will not be shorted out. In this manner, power from a battery or other power source, can be provided to the chip 190 and for powering the electro-active lens 100, by simply making an electrical contact to the positive contact 182 and negative contact 180 of the electro-active lens assembly 100. Other geometric layouts of the electrical contacts may prove convenient, and the chip 190 may be moved to other locations.

It will be understood by those of ordinary skill in the art that although one contact is designated as a positive contact and one is designated a negative contact, the positive and negative polarity may be reversed.

Figure 3A:
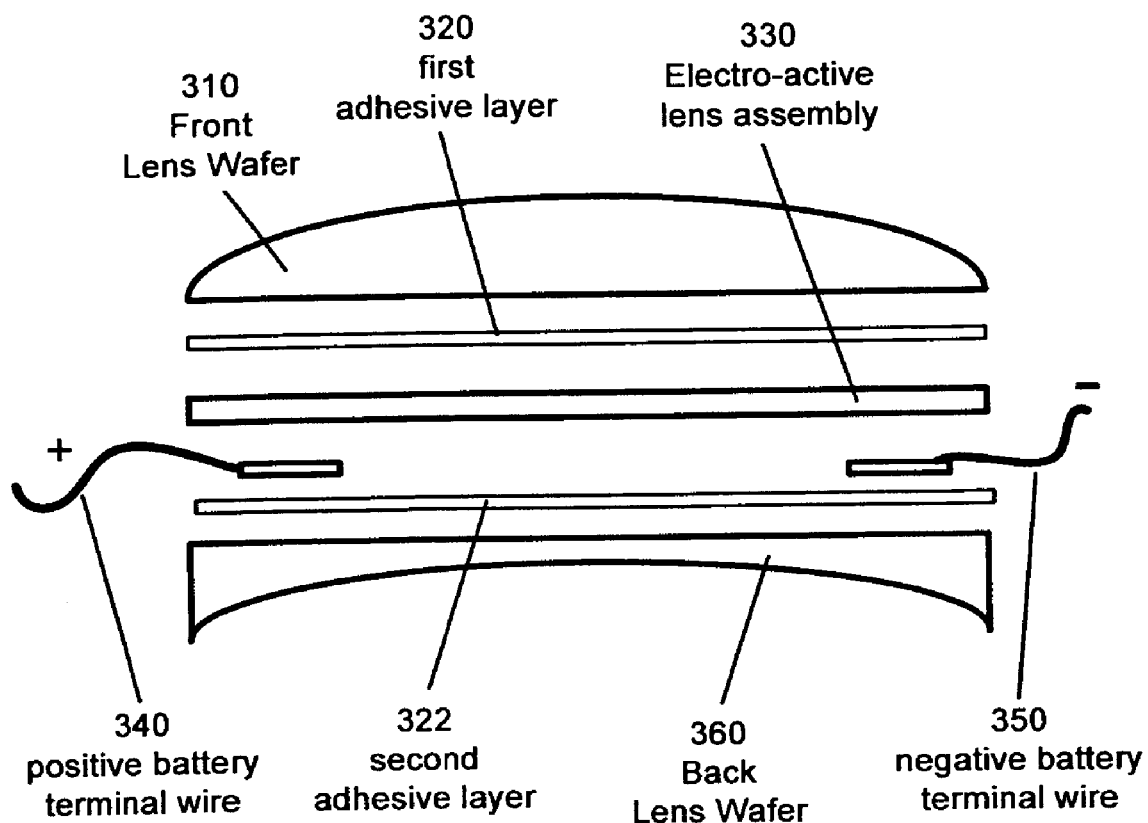
FIG. 3A is an expanded view of a composite lens assembly according to an embodiment of the invention.
Figure 3B:
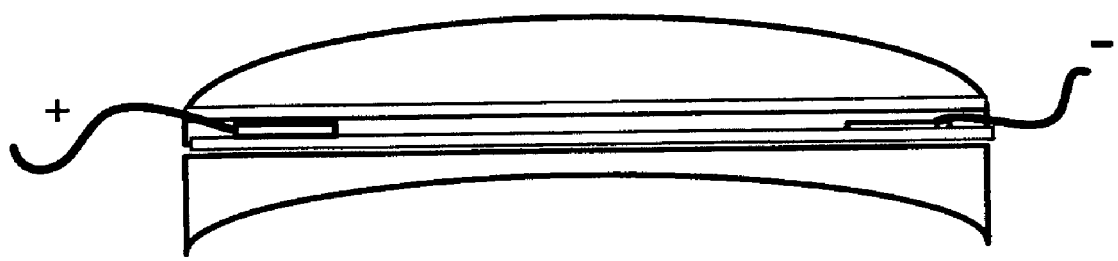
FIG. 3B displays an assembled view of the composite lens assembly of FIG. 3A.

With reference to FIGS. 3A and 3B, an illustrative embodiment of the invention combines an electro-active lens element of the type described above in FIGS. 1 and 2 with a pair of lens wafers to produce a composite lens assembly 300 having a fixed or base power.

FIG. 3A displays an expanded view of the composite lens assembly 300. The elements of the composite lens assembly are:

a front lens wafer 310,
a first adhesive layer 320,
an electro-active lens 330 (for example, the electro-active lens described in FIGS. 1 and 2),
a positive battery terminal wire 340 and a negative battery terminal wire 350,
a second adhesive layer 322, and
a back lens wafer 360.

The front lens wafer 310 may have a substantially flat lower surface. Alternately, the interior lower surface of the front lens wafer 310 may be curved to match a curved electro-active lens assembly. The front lens wafer 310 may be constructed from glass or optical grade plastics, such as, by way of example only, CR39, polycarbonate, or high index polymers. The front lens wafer 310 may be constructed from different materials than the back lens wafer, for example one from glass and one from plastic. The front lens wafer 310 may have substantially flat upper and lower surfaces, and thus have plano (or null) refractive power. The upper surface of front lens wafer 310 may be curved, and thus create refractive power. The substantially flat lower surface of front lens wafer 310 is adjacent to the substantially flat first adhesive layer 320.

The first adhesive layer 320 may be flexible or rigid, and may be index-matched, the index of refraction may be matched to the index of refraction of the adjacent wafer. The substantially flat lower surface of first adhesive layer 320 is adjacent to the substantially flat electro-active lens assembly 330.

The electro-active lens assembly 330 may be or comprise the electro-active lens assembly 100 as shown in FIG. 1, for example. The substantially flat lower side of electro-active lens assembly 330 may have a positive contact area and a negative contact area as shown in FIG. 1 and in FIG. 2. These contact areas are positioned adjacent to the upper surface of positive battery terminal wire 340 and the upper surface of negative battery terminal wire 350. Said wires may also be flat strips. Said wires may be attached to alternate power sources, such as storage capacitors or solar cells.

Alternately, in one embodiment (not shown) the electro-active lens assembly 330 may have a smaller diameter than the lens wafers 310 and 360, and also may have a smaller diameter than lens the adhesive layers 320 and 322. In this embodiment, the adhesive layers would be squeezed around the electro-active lens assembly, and would effectively encapsulate it. In this embodiment, material may be removed from around the edge of the composite lens assembly 300 without contacting or destroying the contacts or the liquid crystal of the electro-active lens assembly 330. Thus, in this embodiment the composite lens assembly 300 may be capable of being edged.

Alternately, in another embodiment (not shown), the electro-active lens assembly 330 may have a smaller diameter than the lens wafers, and may be surrounded by a spacer. Thus, in this embodiment the composite lens assembly 300 may be capable of being edged.

The positive battery terminal wire 340 may terminate in a flat strip with an area corresponding to and aligned with the positive contact area (for example, contact area 282 as shown in FIG. 2) of the electro-active assembly 330. Negative battery terminal wire 350 may terminate in a similar fashion. The lower surface of positive battery terminal wire 340 and the lower surface of negative battery terminal wire 350 are adjacent to substantially flat upper surface of the second adhesive layer 322.

The second adhesive layer 322 is similar in form and function to the upper adhesive layer 320. The substantially flat lower surface of the second adhesive layer 322 is adjacent to the substantially flat upper surface of back lens wafer 360.

Note that the second adhesive layer may deform about the battery terminal wires so as to fill the spaces between the battery terminal wire 340 and battery terminal wire 350, and thus effectively provide a single layer with substantially flat sides.

Additionally, note that the battery terminal wires 340 and 350 may be routed approximately perpendicularly downward through vias (not shown) in the second adhesive layer 322 and vias (not shown) in the back lens wafer 360. When the wires 340 and 350 are routed perpendicularly, and when the diameter of the electro-active lens assembly is reduced (as discussed above), then the composite lens assembly 300 may be edged.

Edging is a well known technique in the art of optics wherein a lens (or the composite lens assembly 300) has material removed from the edge in order to properly position the edged lens inside of a frame relative to the environment. For example, typically an optometrist or optician positions an empty spectacle frame on the patient's face, then makes several measurements, and then edges a lens so that it is properly positioned and aligned inside of the spectacle frame relative to the patient's eye.

The back lens wafer 360 is similar in form and function to the front lens wafer 310. Together, the front lens wafer 310 and the back lens wafer 360 may provide a fixed or base refractive power to the total optical power of composite lens assembly 300. Alternately, the wafers may be piano (have no optical power), and merely serve structural purposes.

FIG. 3B displays an assembled view of the composite lens assembly 300 with a fixed or base power. Specifically, FIG. 3B shows the individual elements of FIG. 3A in an assembled or compressed view. The adhesive layers 320 and 322 hold the composite lens assembly 300 together.

Figure 4A:
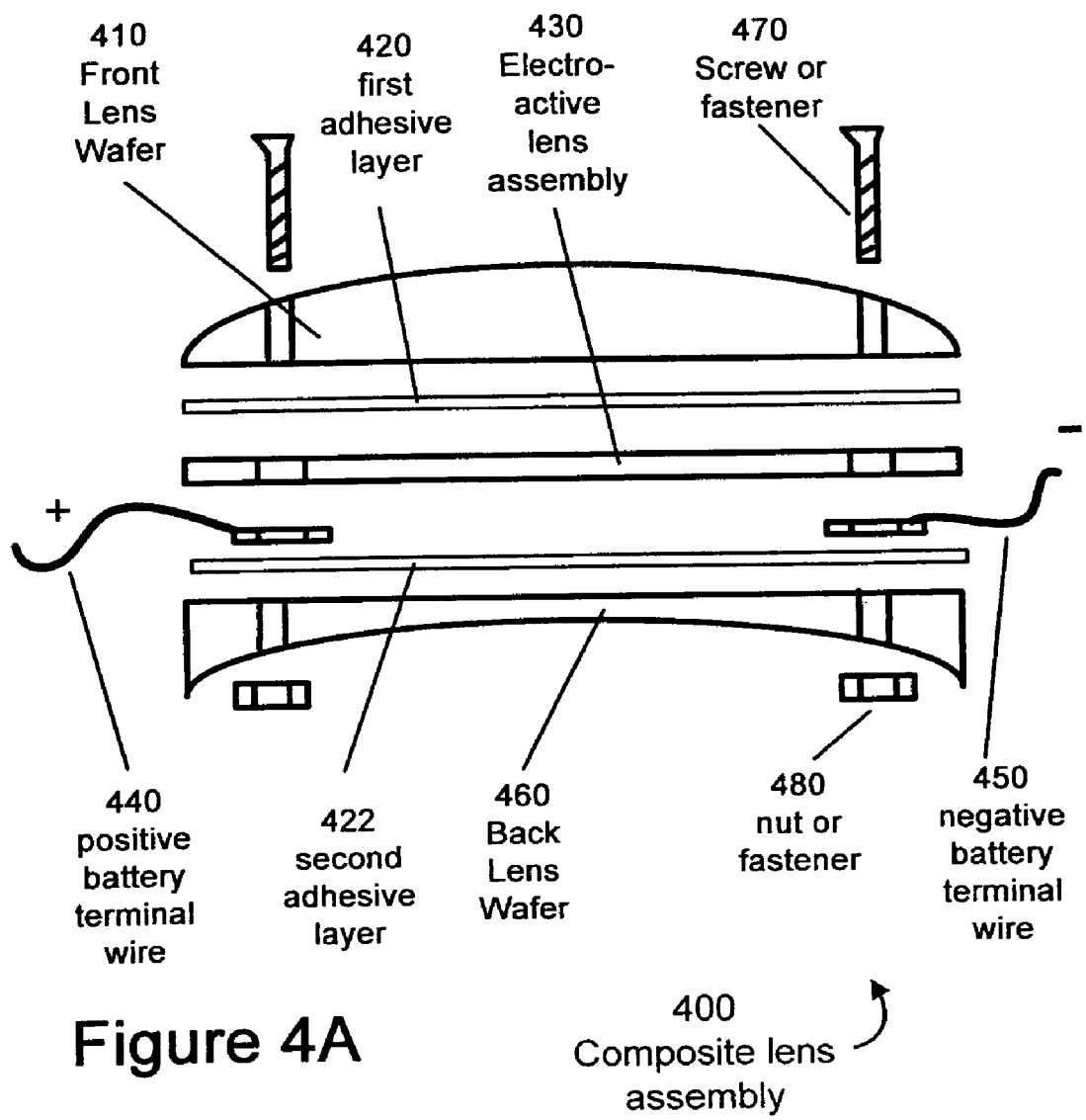
FIG. 4A is an expanded view of a composite lens assembly according to an embodiment of the invention.
Figure 4B:
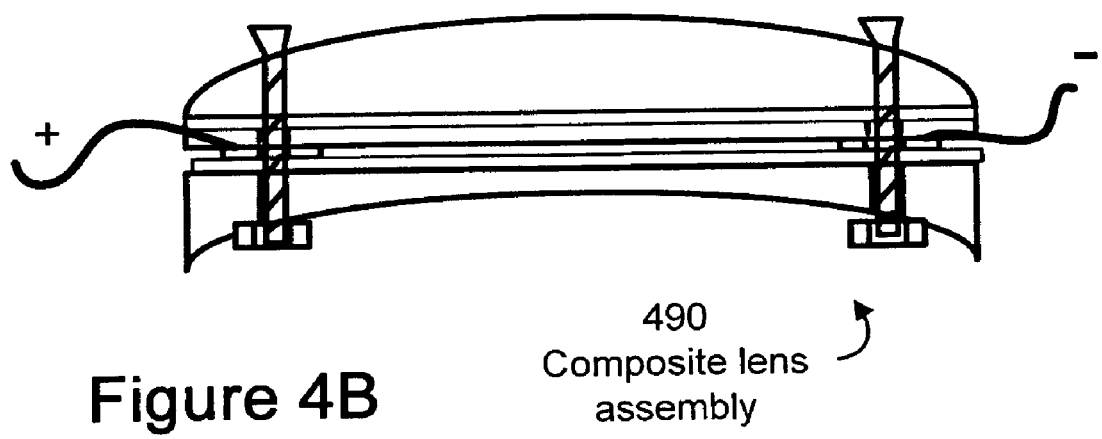
FIG. 4B is an assembled view the composite lens assembly of FIG. 4A.

With reference to FIGS. 4A and 4B, an illustrative embodiment of the invention combines an electro-active lens element of the type described above in FIGS. 1 and 2 with a pair of lens wafers to produce a composite lens assembly 400 having a fixed or base power. Further, FIGS. 4A and 4B introduce screws or fasteners 470 to provide additional mechanical strength to the composite lens. Note that the adhesive layers become optional when the screws or fasteners are introduced.

FIG. 4A displays an expanded view of an embodiment of a composite lens assembly 400 with a fixed or base power and with screws or fasteners. The layers are:

a front lens wafer 410,
an first adhesive layer 420,
an electro-active lens assembly 430 (for example, the electro-active lens described in FIG. 1),
a positive battery terminal wire 440 and a negative battery terminal wire 450,
a second adhesive layer 422, and
a back lens wafer 460.

Additionally, note the screw or fastener 470 and the nut or fastener 480 may be used to add additional support to the composite lens assembly. Screws or fasteners may be particularly useful in rimless spectacle frames, because the screw or fastener may be attached directly to the rimless spectacle frames. In some embodiments the screw or fastener may serve as a conductive path in place of a battery terminal wire. Also, these mounting screws or fasteners may be used to secure the electro-active lens assembly 400 to a spectacle frame (not shown). The first adhesive layer 420 and second adhesive layer 422 are optional because the screw or fastener 470 and the nut or fastener 480 may provide adequate support for the composite lens assembly 400. Additionally, the positive battery terminal wire 440 and negative battery terminal wire 450 are optional because the power may be conducted through the fasteners 470 and 480.

Routing the power through the screws or fasteners provides additional benefits. Specifically, if the electro-active lens assembly has a smaller diameter than the wafers (and possibly surrounded by a spacer as discussed above), then the composite lens assembly 400 is capable of being edged.

Edging is a well known technique in the art of optics wherein a lens (or the composite lens assembly 400) has material removed from the edge in order to properly position the edged lens inside of a frame relative to the environment. For example, typically an optometrist or optician positions an empty spectacle frame on the patient's face, then makes several measurements, and then edges a lens so that it is properly positioned and aligned inside of the spectacle frame relative to the patient's eye. Edging composite lens assembly 400 (with power routed through the screws or fasteners) would not damage any electrical connections, and would not damage the liquid crystal. With the exception of the screw or fastener 470 and the nut or fastener 480, the other elements are the same as those previously described with respect to FIG. 3A composite lens assembly 300.

FIG. 4B displays an assembled view of the composite lens assembly 400 with a fixed or base power, and including screws or fasteners.

Figure 5:
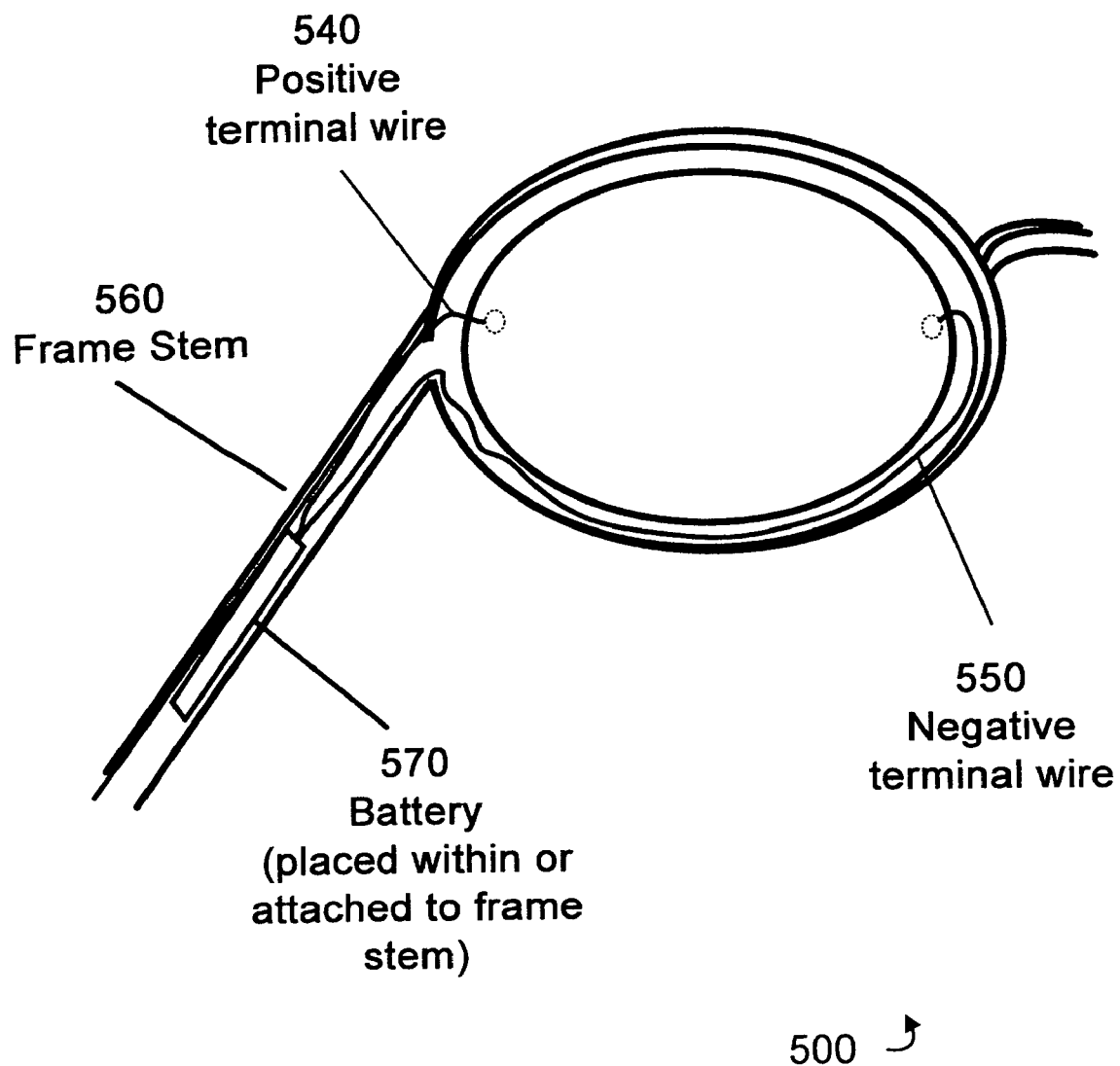
FIG. 5 displays a composite lens assembly according to an embodiment of the invention mounted inside of a spectacle frame.

FIG. 5 displays an embodiment of a composite lens assembly 510 mounted inside of a spectacle frame 500. The composite lens assembly 510 may, for example, be similar to the composite lens assembly 300 of FIGS. 3A and 3B may be mounted inside of spectacle frame 500.

Specifically, in FIG. 5 positive terminal wire 540 and negative terminal wire 550 electrically connect the electro-active lens assembly to a power supply such as a battery 570 attached to a frame stem 560. The wires (540 and 550) may be light gauge wires, or may be conductive strips.

The frame in FIG. 5 is a hinge-free design, but a hinged frame can also be used without deviating from the scope of the present invention. While the figure illustrates placement of the battery or power source on the frame stem, the power source may also be placed in or on the lens, adjacent to the lens, on or inside the bridge, nose pad, hinge, or where the hinge meets the frame front, which would potentially allow for shorter connections between the power source and the lenses. However, if the battery is relatively large, then one comfortable battery placement may be where the spectacle frame stem rests upon the ear, so that the ear carries the weight. The power supply may comprise a battery, a capacitor, a solar cell, or some combination of these power sources. For example, a solar cell may charge a capacitor. Further, the mechanical power of folding closed or opening the spectacle frame stem may be used to charge a battery or a capacitor.

Figure 6:
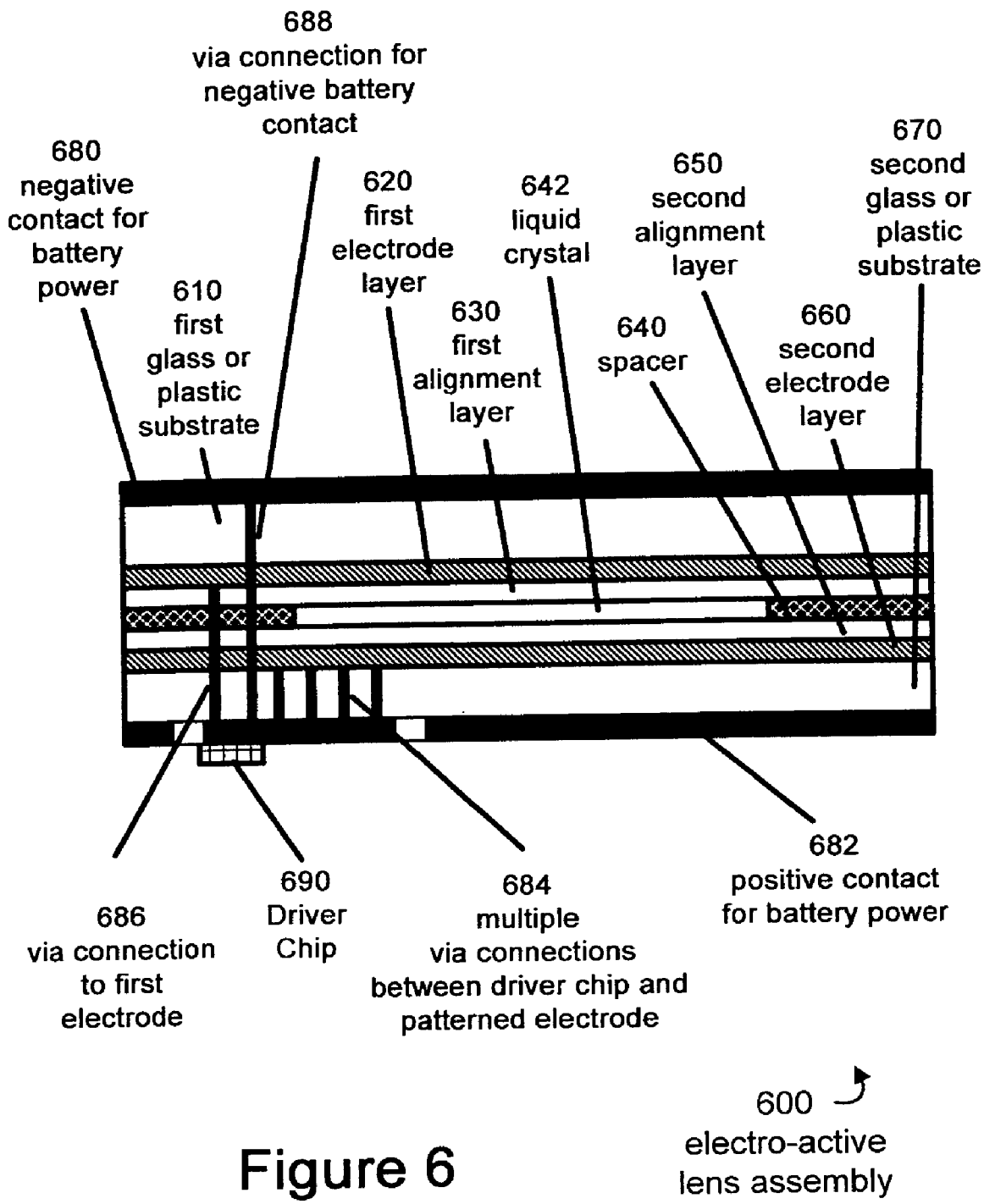
FIG. 6 is a section view of an electro-active lens assembly that may be used in or in conjunction with embodiments of the invention.

FIG. 6 illustrates an embodiment of an electro-active lens assembly that is similar to the embodiment in FIG. 1. However, the electro-active lens assembly 600 of FIG. 6 has positioned the positive contact on the bottom and the negative contact on the top, in contrast to the electro-active lens assembly 100 of FIG. 1 which has positioned both contacts on the bottom. Changing the position of the contacts requires changing the position of the vias, as illustrated in FIG. 6.

Specifically, FIG. 6 displays a side view an embodiment of an electro-active lens assembly 600 with positive contact on the bottom and with negative contact on the top. The layers are:
- a negative contact for battery power 680,
- a first glass or plastic substrate 610,
- a first electrode layer 620,
- an first alignment layer 630,
- a liquid crystal layer 642, and a spacer 640,
- an second alignment layer 650,
- a second electrode layer 660,
- a second glass or plastic substrate 670,
- a positive contact for battery power 682, and
- a driver chip 690.

Additionally, note a via connection 686 to the first electrode layer 620, and an ultra thin wire via connection 688 to the negative contact for battery power 680, and multiple through hole via connections 684 between the driver chip 690 and the patterned electrode layer 660. Electrical contacts through the various vias may be made with transparent conductors such as ITO, that can be deposited during iterative lithographic steps, or by ultra thin metal wires, designed for minimizing any adverse cosmetic effects.

Note that the battery contacts 680 and 682 are physically separated and placed on the top and bottom of the electro-active lens respectively. This physical separation decreases the possibility of short circuits, and simplifies placing the terminal wires.

Thus, the electro-active lens assembly 600 is almost identical to the electro-active lens assembly 100 shown in FIG. 1, except for the relocation of the negative contact for battery power to the opposite side of the electro-active lens assembly, and except for the new related via 688.

Figure 7A:
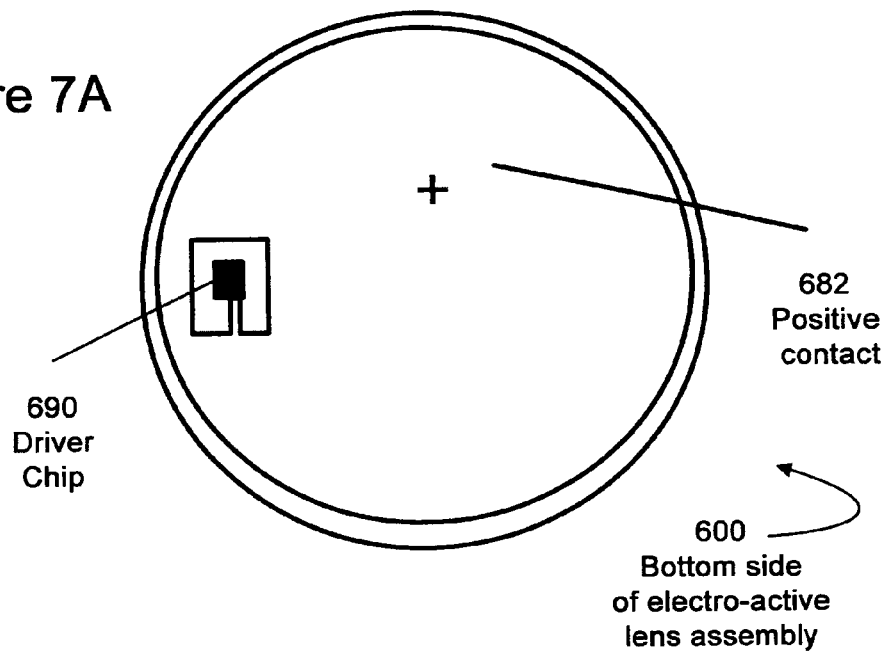
FIG. 7A is a bottom view of the electro-active lens assembly of FIG. 6.
Figure 7B:
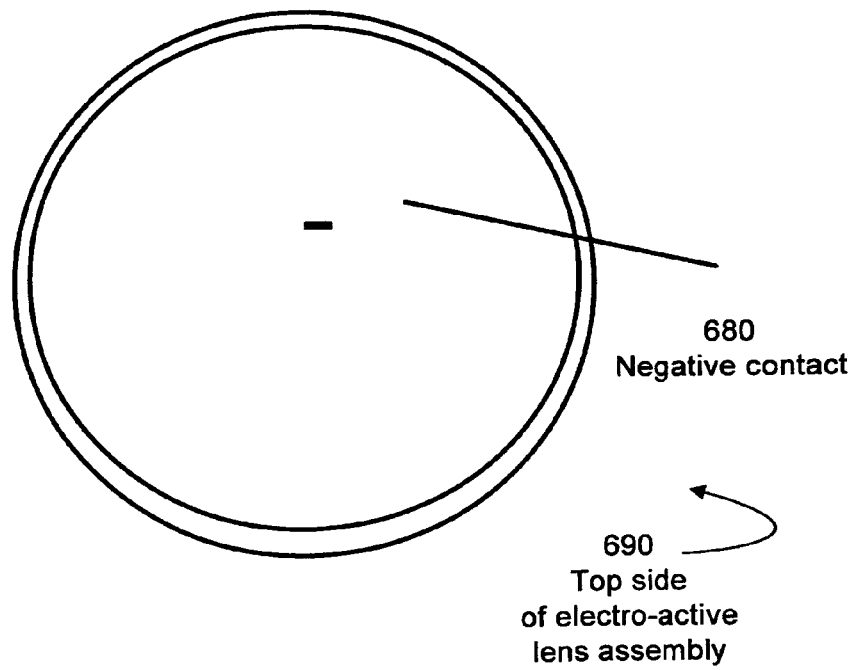
FIG. 7B is a top view of the electro-active lens assembly of FIG. 6.

FIGS. 7A and 7B illustrate bottom and top views of the electro-active lens element 600 from FIG. 6, showing an illustrative configuration for the electrical contacts 680 and 682.

Specifically, FIG. 7A displays the underside of the electro-active lens assembly 600 which shows the positive contact 682 which is connected to a driver chip 690. FIG. 7B shows the top of the electro-active lens assembly 600 which shows the negative contact 680. The negative contact 680 is connected to the driver chip 690 through a wire via 688. As shown in FIG. 6, the via 688 passes through the upper substrate 610, the first electrode layer, the spacer 640 in the liquid crystal layer, the second electrode layer 660 and the lower substrate 670 to the driver chip 690. The electro-active lens assembly 600 may be powered or charged through the positive contact 682 and negative contact 680. In addition to power, the positive contact 682 and the negative contact 680 may carry an embedded control signal to communicate with the driver chip 690.

Figure 8A:
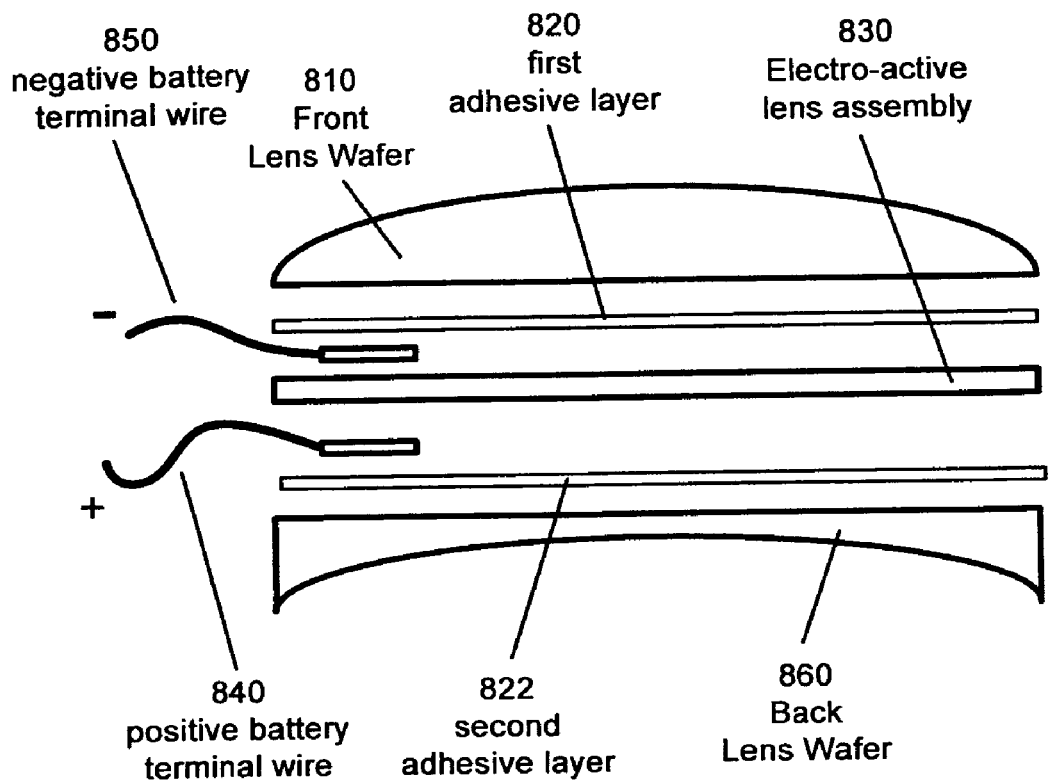
FIG. 8A is an expanded view of a composite lens assembly according to an embodiment of the invention.
Figure 8B:
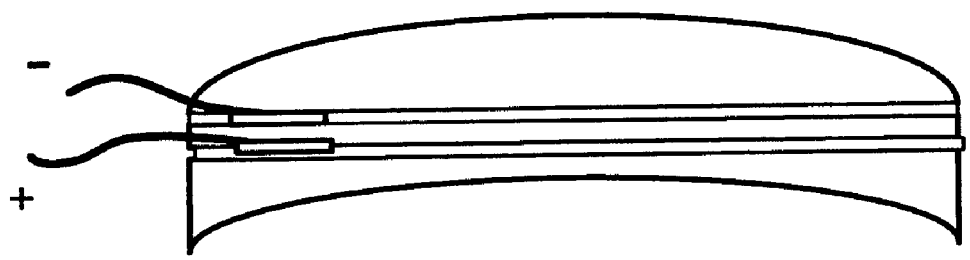
FIG. 8B is an assembled view the composite lens assembly of FIG. 8A.

With reference to FIGS. 8A and 8B, an illustrative embodiment of the invention combines an electro-active lens assembly of the type described above in FIGS. 6 and 7 with a pair of lens wafers to produce a composite lens assembly 800 having a fixed or base power.

FIG. 8A displays an expanded view 800 of an embodiment of a composite lens assembly with an electro-active lens assembly that has battery contacts on opposite sides. From top to bottom, FIG. 8A displays:
- a front lens wafer 810,
- a first adhesive layer 820,
- a negative battery terminal wire or strip 850,
- an electro-active lens assembly 830 with battery contacts on opposite sides (like electro-active lens assembly 600 in FIG. 6),
- a positive battery terminal wire or strip 840,
- a second adhesive layer 822, and
- a back lens wafer 860.

The composite lens assembly 800 is similar to composite lens assembly 300 in FIG. 3A, except that the position of the negative battery terminal wire has been moved to the opposite side of the electro-active lens assembly 830 to follow the movement of the negative contact to the upper side of the electro-active lens assembly 830. Thus, the composite lens assembly 800 has battery terminal wires separated by the body of the electro-active lens assembly 830. This separation allows (but does not require) the battery terminal wires to exit the composite lens assembly 800 in the same radial direction. For example, in FIG. 8A both battery terminal wires exit to the left, and may be easily ganged together or joined into a bus.

Although not shown, composite lens assembly 800 may be joined by fasteners or screws, and the fasteners or screws may be used to conduct the electrical power.

FIG. 8B displays an assembled view of the composite lens assembly 800 with the negative battery terminal wire near the positive battery terminal wire.

While the geometries discussed herein and illustrated in the figures are flat, it is conceivable that curved parallel surfaces could also be employed that would allow for thinner composite lenses to be fashioned by the assembly methods described herein. In embodiments where the electro-active lens assembly is curved, one of the two wafers may be eliminated as the electro-active lens assembly would provide one of the two curved surfaces required to complete the distance vision optical power.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from the spirit or essential attributes.

What is claimed is:

1. A composite eyeglass lens assembly for an eyeglass frame, comprising:
   a. a first lens having a fixed optical power;
   b. a second lens having a fixed optical power;
   c. a dynamic electro-active lens disposed between said first and said second lenses; and d. a connecting element extending through said first lens, said second lens, and said electro-active lens for securing to the eyeglass frame, wherein said connecting element is adapted for conducting electricity to said electro-active lens from the eyeglass frame.

2. The composite lens assembly of claim 1, wherein at least one of the first and second lenses is formed from a polymeric material.

3. The composite lens assembly of claim 1, wherein at least one of the first and second lenses is formed from a glass material.

4. The composite lens assembly of claim 1, wherein said connecting element is a bolt.

5. The composite lens assembly of claim 4, wherein the dynamic electro-active lens comprises:
   a. a first electrode layer;
   b. a second electrode layer; and
   c. a liquid crystal layer disposed between said first and said second electrode layers.

6. The composite lens assembly of claim 5, wherein the dynamic electro-active lens further comprises:
   a. a driver chip in electrical communication with the first and second electrode layers for controlling application of electrical power to the first and second electrode layers; and
   b. at least one electrical contact layer in electrical communication with said driver chip, wherein said at least one electrical contact layer has a first contact area and a second contact area, wherein said second contact area is electrically isolated from the first contact area.

7. The composite lens assembly according to claim 6, wherein said first and said second contact areas are formed from a substantially transparent material.

8. An electrical composite eyeglass lens assembly, comprising:
   a. a first lens having a fixed optical power;
   b. a second lens having a fixed optical power;
   c. a dynamic electro-active lens disposed between said first lens and said second lens; and
   d. a connecting element extending through said first lens, said second lens, and said electro-active lens, wherein said connecting element secures the first lens, the second lens, and the electro-active lens together, wherein said connecting element is adapted for providing electrical communication to said dynamic electro-active lens.

* * * * *